REISSUED OCT 4 1870
4142
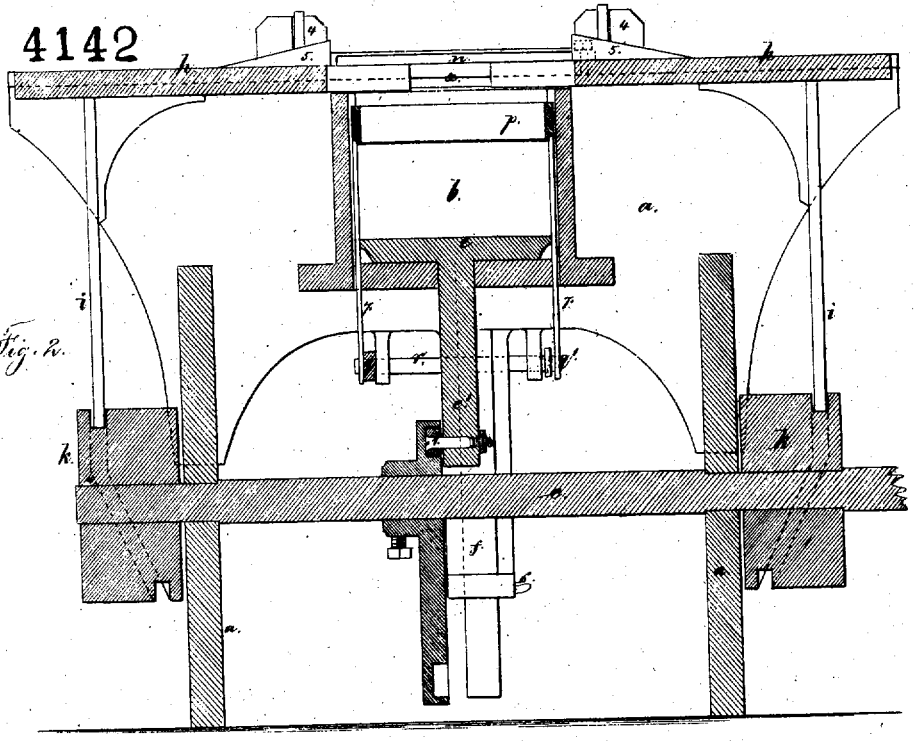
Wm. F. Williams' machine for Bundling kindling wood.
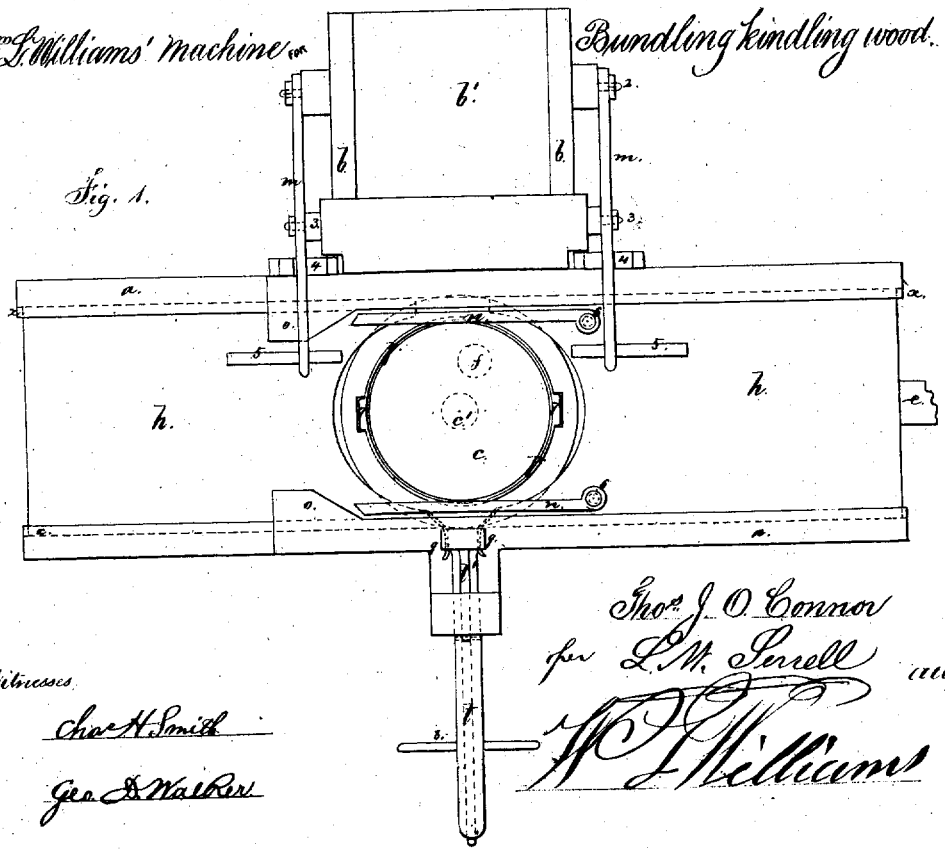
Witnesses
Chas. H. Smith
Geo. D. Walker
Thos. J. O'Connor
per L. M. Serrell Atty
W. F. Williams Wm. L. Williams — Machines — bundling kindling wood.

Thomas J. O. Connor
per L. W. Serell
atty

Witnesses,
Chas H. Smith.
Geo. D. Walker

Wm L. Williams

United States Patent Office.

WILLIAM L. WILLIAMS AND THOMAS J. O'CONNOR, OF NEW YORK, N. Y.
ASSIGNEES OF WILLIAM L. WILLIAMS.

Letters Patent No. 26,147, dated November 15, 1859; reissue No. 4,142, dated October 4, 1870.

IMPROVEMENT IN MACHINES FOR BUNDLING WOOD.

The Schedule referred to in these Letters Patent and making part of the same

*To all to whom these presents shall come:*

Be it known that WILLIAM L. WILLIAMS, of the city and State of New York, did invent a certain new and useful Improvement in Machinery for Bundling Kindling-Wood; and the following is declared to be a full and correct description of the same, reference being had to the annexed drawing making part of this specification, wherein—

Figure 1 is a plan of said machine;

Figure 2 is a longitudinal section; and

Similar marks of reference denote the same parts.

Figure 3:
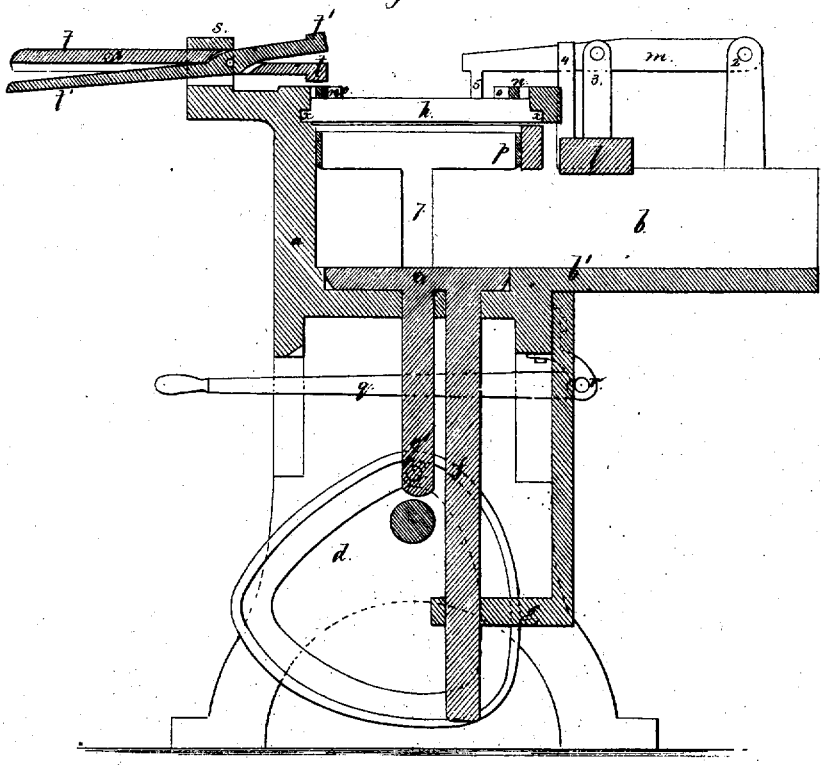
Figure 3 is a cross-section.

Before this invention, a means had been employed for bundling kindling-wood, as in English Patent No. 12,542, March 28, 1849, the same having a rounded recess or cavity, in which the wood was placed, and then pressed by pairs of followers, to consolidate it. In this instance, the irregularity of the pieces of wood interfered with the bundle being consolidated at the place where the string was applied, because the ends of the wood were not free, and hence pressure might spring a crooked or knotty piece, and make it in such a form that, when released from pressure, the bundle would become looser.

Another machine for bundling kindling-wood is shown in English patent No. 5,169, May 14, 1825, in which there is a complete ring, into which the wood is packed, and then compressed by a segment hinged to said ring.

This present invention is intended to overcome the difficulties existing in previous machines, and consists in means for pressing kindling-wood into circular or nearly circular bundles between semicircular pressing-jaws that are opened for easily receiving the wood, and, when closed, press upon the wood contiguous to the place where the wire or string is applied. Thereby the wood will be compressed sufficiently to form a firm bundle when tied, and the opening of the jaws will allow for introducing or removing the bundle with facility.

In the drawing—

*a* is a frame-work of suitable character, on one side of which is a trough, *b*, into and through which the kindling-wood can be passed, the same having been sawed in lengths, and split by suitable machinery to the desired size, and the pieces standing vertical in said trough, and being forced along therein, so as to occupy the concave or rounded end of the trough *b*.

In the bottom *b'* of the trough *b* a circular follower, *c*, is introduced, that is so fitted that it can be raised up and down by hand, or otherwise.

This follower is shown as guided by a pin or slide, *f*, and as being moved by a cam, *d*, on a shaft, *e*, rotated by hand, or otherwise, and acting on a roller, 1, on the slide *c'*.

It will be seen that, the wood being pressed along in the trough over the follower *c*, if said follower is lifted, a bundle of wood of a circular form will be lifted through the ring *p*, and can be tied or wired by hand above said ring. It, however, sometimes occurs that the pieces of wood, from their width, may rest at the bottom on the follower *c*, and a portion of their top ends be beneath the ring *p*, and thus obstruct the follower. The circular ring *p* is, therefore, made as a knife, with slings, 7 7, attached to suitable levers, *q q'*, on a short shaft, *r*, so that said ring-knife can be drawn down and split out or separate, on one-half or its whole circumference, a bundle off from the mass of split kindling-wood in the trough *b*, and said bundle, upon being lifted by the follower *c* or the ring in its ascent, can receive a string or wire to retain it.

In order that the bundle of wood may be consolidated, semicircular jaws *h h* are made use of.

Said jaws are represented as set to move in grooves, *x x*, on the inner faces of the frame *a a*, and a compressing force is brought against the sides of the bundle by the grooved cams *k k* acting on the standards *i i*, or by other suitable mechanism.

*n n* are compressing-levers set on fulcrums, 6, on one slide *h*, and acted on by inclines, *o o*, that may be used, so that the bundle receives a sidewise compression from these levers at right angles to that given by the slides *h h* themselves. While thus compressed, the bundle is secured by a string or wire, the compression acting contiguous to the place where the string is applied, so that the bundle will be firmly held when tied.

The wire made use of has to be annealed, so as to be easily twisted. The operator passes the wire around the bundle by hand or suitable mechanism, and places the ends within the grooves formed in the rotating pinchers *t t'*, which pinchers are formed of two jaws, that can be opened or shut, and can be turned around in the supporting-standard *s*. It will now be evident that the ends of the wire, being entered into the grooves at 9 9, fig. 1, between the jaws *t t'*, (by the handle 8, or otherwise,) tightens the wire by crossing it in the act of twisting, and secures the bundle very firmly.

As the wood passes along in the trough *b*, there sometimes may be pieces projecting slightly above the others, so that they would not pass under the ring *p*. A weight, *l*, is, therefore, provided, attached, by slings 3 3, to levers *m m*, fulcrumed at 2 2, and guided by jaws 4 4, said levers and the weight *l* being raised at the time of feeding the wood along by inclines, 5 5, on the slides *h h*, and, as the bundle is compressed, the weight *l* drops upon the wood in the trough *b*, and brings the ends to a level, ready for being pressed forward in forming the next bundle.

What is claimed as the invention of WILLIAM L. WILLIAMS is—

1. The follower *c* and receptacle *p*, in combination with the trough *b*, and operating in substantially the manner and for the purposes specified.

2. The ring-separator or knife *p*, applied to separate from the mass of kindling-wood a bundle, substantially as described and shown.

3. The arrangement of the follower *c*, ring-separator or knife *p*, trough *b*, and mechanism, as described, for actuating the follower and knife, substantially as set forth.

4. Arranging the receiving and compressing mechanism, as specified, so as to act contiguous to the place where the cord or wire is to be applied to the bundle, for the purposes specified.

5. The compressing-levers *n n*, in combination with the jaws or slides *h h*, substantially as and for the purposes set forth.

6. The twisting-jaws or pinchers *t t'*, constructed as specified, to receive the wire, and twist the same, as specified.

7. The weight *l*, hung on the levers *m m*, and applied in the manner specified, to bring the wood into position endwise, as set forth.

Dated May 26, 1870.

W. L. WILLIAMS.
THOMAS J. O'CONNOR.

Witnesses:
CHAS. H. SMITH,
GEO. T. PINCKNEY.